Patented Oct. 10, 1944

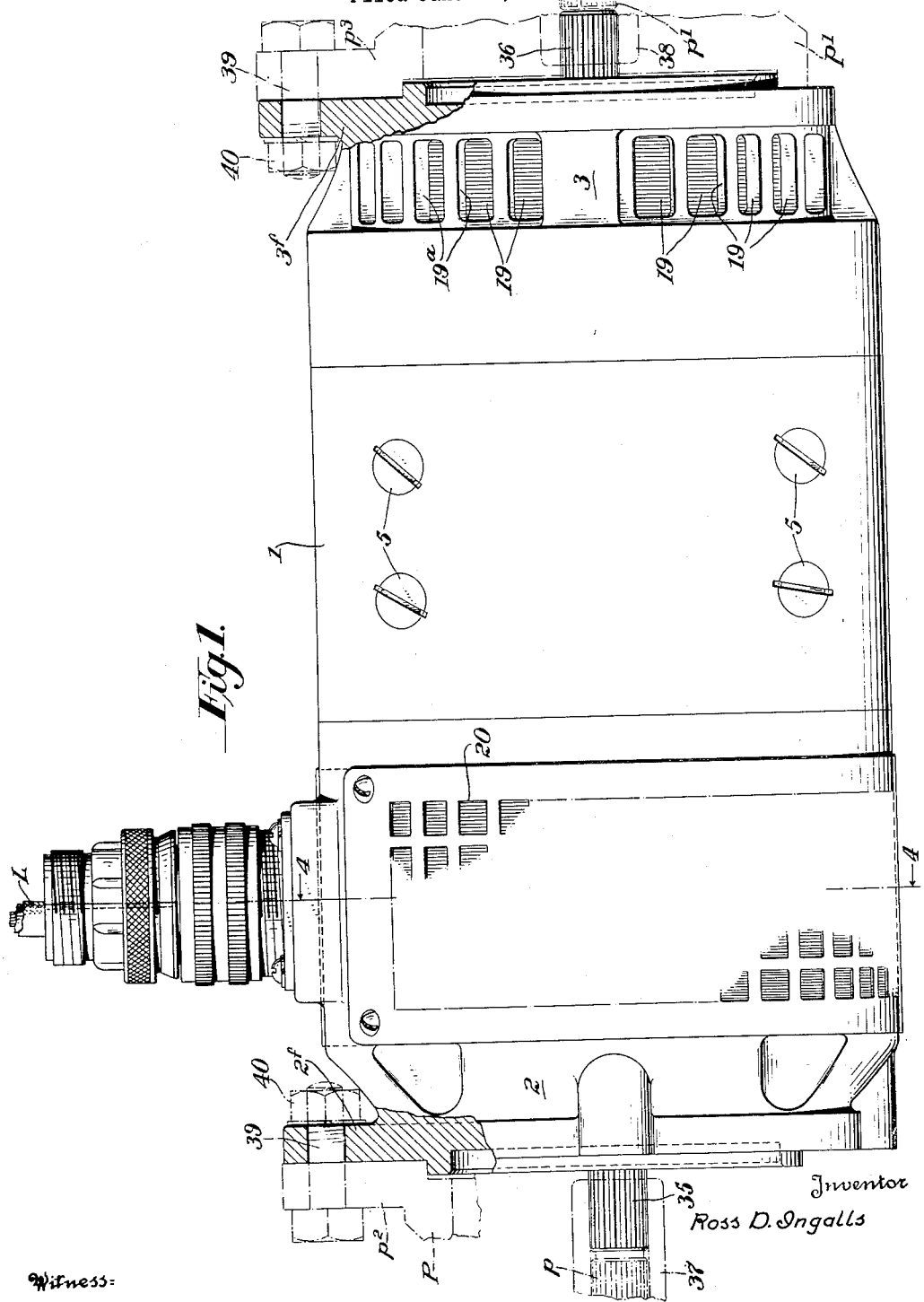

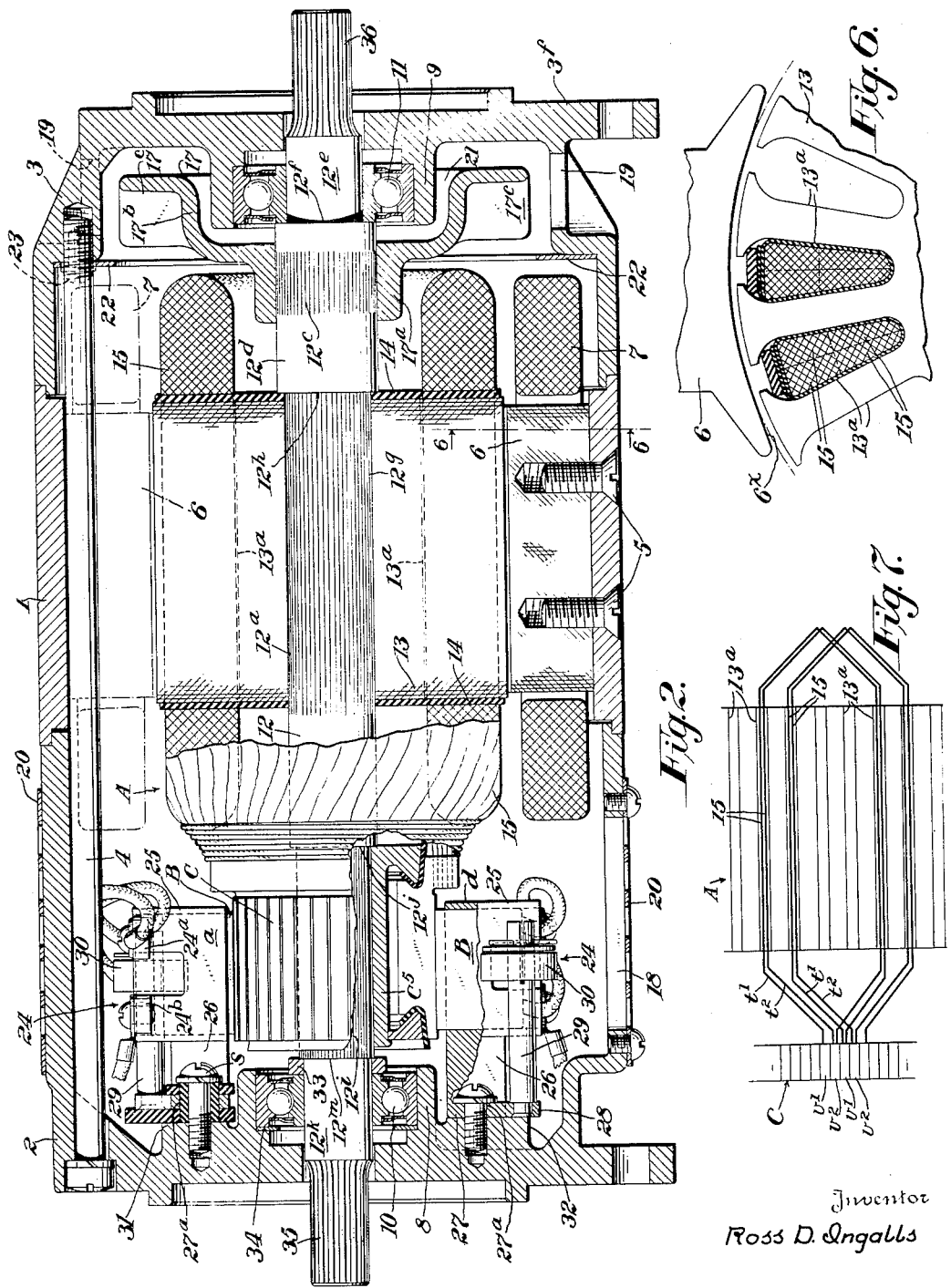

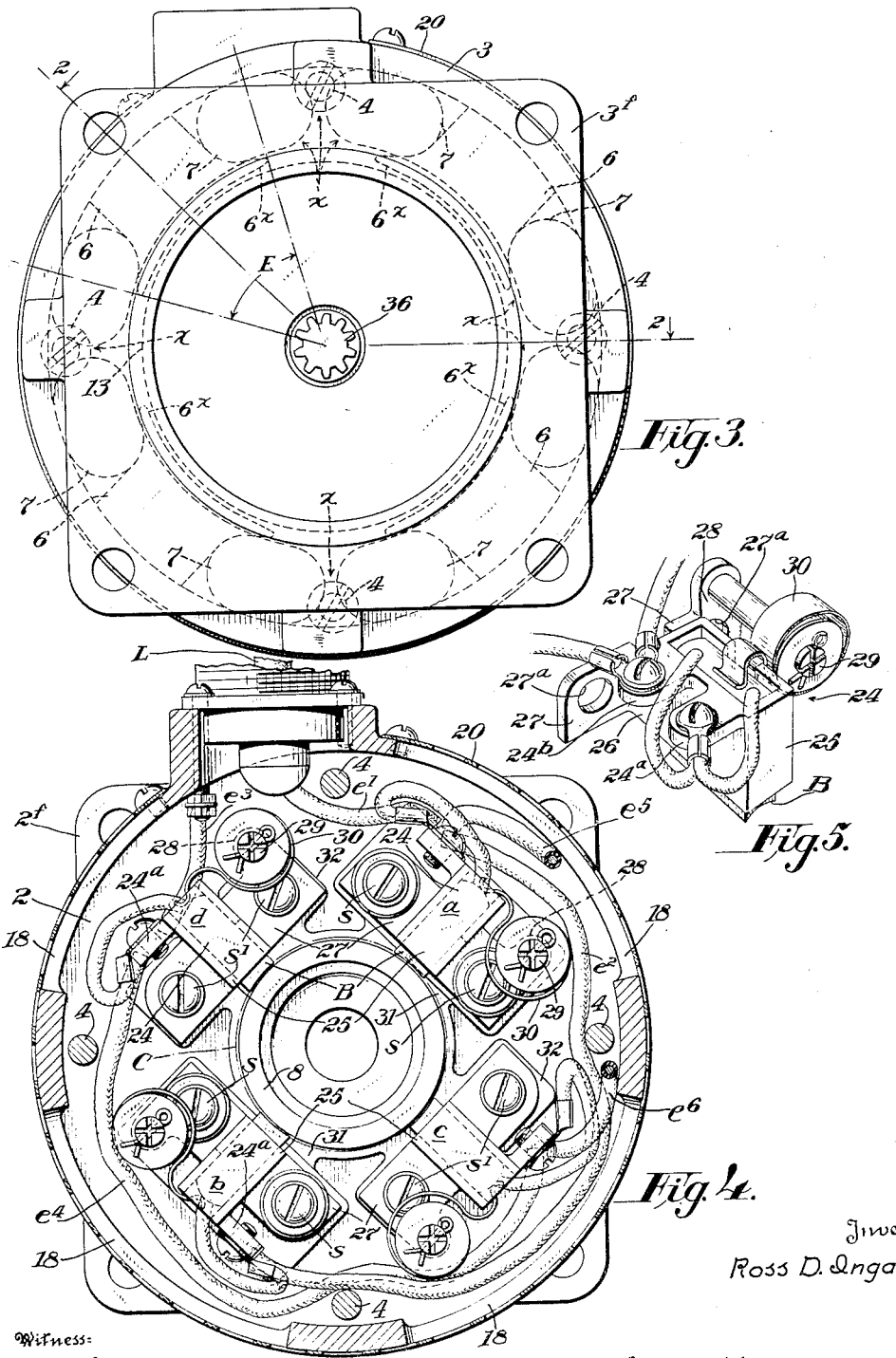

2,360,303

UNITED STATES PATENT OFFICE 2,360,303

ELECTRIC MOTOR FOR MILITARY AIRCRAFT

Ross D. Ingalls, Scotch Plains, N. J., assignor to The Singer Manufacturing Company, Elizabeth, N. J., a corporation of New Jersey Application January 12, 1942, Serial No. 426,386

5 Claims. (Cl. 172—36)

This invention relates to electric motors and it has as an object to provide an improved electric motor particularly adapted for use in military aircraft to actuate certain movable elements such, for example, as gun turrets.

Certain types of military aircraft employ a dozen or more electric motors for actuating various devices. In many instances such motors are required to operate under full load only periodically, while in intermediate periods they operate either under reduced load or under no load.

To be suitable for military aircraft, it is essential that an electric motor have an extremely high power output per unit of weight and that it be as small and compact as possible, inasmuch as space for its installation is often at a premium.

A further object of this invention therefore is to provide a relatively small electric motor, adapted to be operated by the 24 volt circuit commonly provided in military aircraft, which is capable of operating on an intermittent load cycle of two horsepower at approximately 4000 R. P. M. for five minutes and ¼ horsepower at approximately 4400 R. P. M. for twenty minutes, alternately, with a rise in temperature of not more than 70 degrees centigrade. This speed range is limited by the nature of the devices which are to be actuated by the motor.

To be suitable for the work for which the present motor is intended, it is essential that, at all loads between minimum and maximum, the speed characteristic be held much closer than is ordinarily required for general purposes.

Conventional electric motors which would satisfy this speed and power requirement are approximately ten inches in diameter, twelve inches in length and weigh between eighty and one hundred pounds, depending upon the material used in their construction. Because of their size and weight such motors are wholly unsuited for use in military aircraft.

The present invention has provided an improved electric motor, capable of meeting the above mentioned requirements, in which the motor casing is only five inches in diameter, less than nine and one-half inches in length and in which the entire motor weighs only nineteen pounds.

In the art of dynamo electric machines it is well recognized that for fixed current and flux densities the power output is proportional to the product $D^2LN$, where $D$ is the diameter of the armature core, $L$ is the length of the armature core and $N$ is the angular velocity of the armature. For a given casing diameter, length of core and speed, it is evident that the ratio of the casing diameter to the armature diameter should be as low as possible in order to effect a maximum power output per pound of active material. This means that the annular space available between the armature and the outside of the motor casing for the field winding must be a minimum or, in terms of copper requirements, that the ratio of the main field ampere turns per pole to the armature ampere turns per pole must be as low as possible to obtain the maximum utility from the active material.

It is also known that in dynamo electric machines of the commutator type the value of main field ampere turns per pole relative to the armature ampere turns per pole cannot be decreased below that at which the field distortion produced thereby causes unsatisfactory commutation.

In large machines, where space is available, commutating poles are provided to correct the field distortion. By the use of commutating poles it is possible to attain a ratio of field to armature ampere turns per pole as low as .75. In small frame sizes, such as that of the present invention, the use of commutating poles is impracticable due to lack of space. Therefore it has been considered impracticable, in small machines, to obtain a ratio lower than 1.7, although the desirability of a lower ratio has been well recognized, provided satisfactory commutation could be obtained.

With the above facts in mind and in an endeavor to provide a small, compact motor having a high output per unit weight and suitable for use in military aircraft, I have departed from accepted practice and have built a direct current motor without commutating poles of any kind and yet with a ratio of field to armature ampere turns per pole at full load of the unusually low value of 1.13. This motor gives satisfactory commutation, is stable over its load range and weighs only nine and one-half pounds per rated horsepower. This has been made possible by an ingenious selection and combination of design factors, at least one of which, standing alone, would adversely affect the machine but which when combined, as here proposed, produce a machine which is small in size and light in weight relative to its rated output and which does not have any objectionable rise in temperature. Stated more specifically, I have accomplished this result by establishing the ratio of the main field ampere turns per pole to the armature ampere turns per pole at a value less than 1.2. This results in power output per unit weight of active material greater than heretofore was obtainable in machines of the non-commutating pole type, thereby reducing the weight and overall size of the motor. This ratio, however, tends to produce field distortion which, in turn, adversely affects commutation to a degree at which, unless otherwise compensated for, would cause destructive heating. I have been able to tolerate this poor commutation by so improving other factors of commutation that the overall commutation is maintained well within satisfactory limits. These other factors include (a) providing twice as many commutator bars as armature slots, which produces lower-than-normal reactance voltage (b) chamfering the pole-pieces and (c) reducing the ratio of pole arc to pole pitch from the conventional .70 to .65 which, collectively, tend to improve commutation and therefore counteract or compensate for the abnormally poor commutation resulting from the low ratio of field to armature ampere turns per pole.

The parts of the magnetic circuit have been so proportioned that the ampere turns required to force the flux through the air gap and the armature teeth are a large proportion of the total ampere turn requirement, being in the present case approximately 70 per cent. The armature teeth are saturated at a flux density of about 136,000 lines per square inch. The flux density of the yoke is held just below saturation at 97,000 lines per square inch while the pole and armature core are unsaturated at respective values of 71,500 and 62,500 lines per square inch.

It is recognized that certain ones of the factors discussed above are old and well known individually but I do not know and do not believe that the above mentioned factors have ever been combined and utilized in the manner herein described, which is contrary to established practice but which represents a new and improved balance of design factors especially advantageous where light weight and small size are primary considerations.

A still further object of the invention is to provide a light weight, high power, medium speed electric motor capable of simultaneously operating two separate driven devices each of which is directly connected with the motor shaft.

This has been accomplished by extending the armature shaft beyond the end-bonnets at both ends of the motor, and forming the end-bonnets with flanges each adapted to have secured thereto a device, such for example as a hydraulic pump adapted to be driven by the motor, each of said devices being directly connected to one of the projecting ends of the motor shaft. The pumps may, in turn, provide fluid pressure for moving the gun turret or other element to be actuated.

Another object of the invention is to provide an improved electric motor in which the elements thereof may be more readily and more accurately assembled with a minimum of effort and which, when assembled, will positively prevent disarrangement of the parts.

A further object of the invention is to provide an improved brush mount for electric motors.

When supplied from a low voltage circuit, such, for example, as the 24 volt circuit commonly provided in military aircraft, an electric motor of the type herein referred to must carry a relatively heavy current (approximately ninety amperes at full load) through the brushes and commutator bars. This causes high brush $I^2R$ and contact resistance losses which result in high localized heat generation.

Another source of heat generation is the friction caused by the pressure of the brushes on the commutator, which pressure is made relatively high in order to reduce contact resistance to a minimum.

The present invention therefore has as a further object to provide improved means, acting in conjunction with the motor ventilating system, for carrying off and dissipating heat from the commutator and the brushes acting thereon.

This has been attained by effecting maximum thermal contact between the brushes and their holders and in securing certain ones of said holders in direct and substantial metal-to-metal contact with the adjacent end-bonnet of the motor, whereby heat is transmitted, by conduction, from the commutator and brushes to the end-bonnet and the parts connected therewith which act as a radiator to dissipate such heat.

With the above and other objects in view, as will hereinafter appear, the invention comprises the devices, combinations and arrangement of parts hereinafter set forth and illustrated in the accompanying drawings of a preferred embodiment of the invention, from which the several features of the invention and the advantages attained thereby will be readily understood by those skilled in the art.

In the drawings, Fig. 1 is a full size side elevation, partly in section, of an electric motor embodying the present invention and showing in dot-dash lines a portion of each of the driven devices connected thereto.

Fig. 2 is a longitudinal sectional view substantially on the line 2—2 of Fig. 3.

Fig. 3 is a right end view of Fig. 1.

Fig. 4 is a transverse sectional view substantially on the line 4—4 of Fig. 1.

Fig. 5 is a perspective view of one of the improved brush-holders with a brush therein.

Fig. 6 is a detail transverse section substantially on the line 6—6 of Fig. 2.

Fig. 7 is a schematic illustration of the connection between the commutator bars and the armature coils, showing the 2 to 1 ratio of commutator bars to armature slots.

Referring more specifically to the drawings, the invention is disclosed as embodied in an electric motor comprising a main casing including a cylindrical field core 1 and complemental end-bonnets 2 and 3 fitted to the opposite ends of the field-core, the parts being held in assembled relation by means of draw bolts 4. The end-bonnets are made of metal which is relatively light in weight and which has a relatively high coefficient of thermal conductance, such, for example, as aluminum. Secured upon the inner face of the field core 1, as by screws 5, are a plurality of pole-pieces 6 which support surrounding field coils 7 comprising the shunt-field; the field core pole-pieces and field coils constituting the usual stator member. The face of each pole piece is chamfered as shown at 6× in Figs. 3 and 6 and has an enclosure E less than 66% of the pole pitch.

The end-bonnets 2 and 3 are formed with inwardly projecting cylindrical hubs 8 and 9, respectively, into which are fitted anti-friction bearings 10 and 11 which receive and rotatably support the opposite ends of an armature shaft 12. This shaft carries an armature or rotor A comprising a plurality of rotor laminations 13 pressed upon the shaft over a straight knurled portion 12ª between insulating end pieces 14 and forming the armature core, and coils 15 embedded in slots 13ª formed in the core. Secured upon the shaft 12, within the end-bonnet 2, as by being forced upon a straight knurled portion 12¹ of the shaft, is a commutator C which is connected with the coils 15 and which is engaged by suitable brushes, later to be described, supported by the end-bonnet.

As hereinbefore stated I have lowered the reactance voltage of the armature coils by employing twice as many commutator bars as armature slots. This is illustrated diagrammatically in Fig. 7 in which it is seen that the leads $t^1$ and $t^2$ extend from each two adjacent commutator bars $v^1$ and $v^2$ to sides of coils 15 which extend through a single slot 13ª in the armature A.

Secured upon the shaft 12, within the end-bonnet 3, is a high capacity motor-ventilating fan 17 designed to draw a large volume of air into the motor casing through openings 18 in the end-bonnet 2, thence lengthwise of the motor casing through the air gap between the rotor and stator and through the spaces $x$ (see Fig. 3) between the field coils, and discharge it from the motor casing through openings 19 formed in the end-bonnet 3, thereby cooling the motor.

The apertures 19 are separated by relatively thin walls 19ª which serve as heat-dissipating fins from which heat is picked up by the outgoing air stream. The openings 18 in the end-bonnet 2 are covered by protective screens 20. The fan 17 is fixed to the shaft 12 by having its hub 17ª forced upon a straight knurled portion 12ᶜ thereof.

Inasmuch as the air flowing through the spaces $x$ contacts the inner periphery of the motor casing it will pick up and carry off by convection, a portion of the heat which has been transmitted to the casing, by conduction, from the armature, as hereinafter will be explained.

In order to reduce to a minimum the overall length of the motor, the hub 17ª of the fan 17 is designed to telescope within the rotor coils 15, as shown most clearly in Fig. 2. Likewise the body of the fan surrounding the hub is formed with a cup-like portion 17ᵇ which affords a chamber 21 which receives the bearing boss 9 of the end-bonnet 3. Fan-blades 17ᶜ project radially outward from the portion 17ᵇ. By reason of this construction, substantially the entire fan is interfitted with other elements and therefore requires very little additional space for its installation.

It has been found that in certain prior motors the ventilating fan sets up eddy currents in the outgoing air stream with the result that a portion of the air does not pass out of the discharge openings but is re-circulated through the motor thereby greatly reducing the efficiency of the motor-ventilating system. This has been overcome in the present motor by the provision of a circular baffle-plate 22 which is secured by screws 23, within the end bonnet 3 at the intake side of the fan 17. The plate 22 projects radially inwardly from the end bonnet to a line spaced laterally from but substantially coincident with the outer periphery of the fan, thereby preventing a recirculation of air through the motor without obstructing its intake.

To assist in the cooling of the motor, and more particularly the commutator thereof, which otherwise would be the "hot-spot" of the motor, this invention proposes means for drawing off heat from the commutator and dissipating it into the atmosphere. This has been effected by supporting the commutator brushes B in improved brush-holders 24 and in securing certain ones of those brush-holders in direct metal-to-metal contact with the end-bonnet 2. Thus the heat generated in the commutator will be transmitted, by conduction, through the brushes B and brush-holders 24 to the end-bonnet 2 and thence to other parts of the motor casing, from which such heat is dissipated into the atmosphere partly by radiation and partly by convection.

As shown most clearly in Figs. 2 and 5 each brush holder is formed as a casting and comprises a rectangular box-like portion 25 which receives one of the brushes B, with the brush in intimate contact with the walls thereof, thereby effecting good heat conductance from the brush to the brush-holder. Each brush-holder also has a pair of legs 26, projecting laterally from the portion 25, which terminate in relatively heavy feet 27 formed with apertures 27ª for the passage of the attaching screws. In certain ones of the brush-holders the screw-holes 27ª are made sufficiently large to accommodate insulating bushings. One of the feet of each brush holder has an extension 28 which receives and supports a pin 29 which, in turn, carries a brush-depressing spring 30. As shown most clearly in Fig. 4 one brush-holder, designated as $a$ is connected, by a lead $e^1$ to the power supply line L and by a lead $e^2$, to its complemental brush-holder, designated as $b$ spaced 180 degrees about the commutator. The brush-holders $a$ and $b$ are secured, by screws $s$, to supporting pads 31 formed integrally with the end-bonnet 2, but are insulated therefrom as shown in Fig. 2. The other pair of brush-holders, designated as $c$ and $d$, have their feet 27 secured in metal-to-metal contact with similar pads 32 formed integrally with the end-bonnet 2 by screws $s^1$. The brush-holder $d$ is grounded to the motor casing through a lead $e^3$ and is connected to its complemental brush-holder $c$ by a lead $e^4$. The motor casing is grounded in any conventional manner, as for example, through a metallic armor (not shown) which surrounds the power supply line L. Each brush-holder also is formed with a pair of laterally extending ears 24ª and 24ᵇ. The ears 24ª each have connected thereto one end of each of a pair of pigtails the other ends of which are embedded in the associated brush. The ears 24ᵇ are used as connections for the leads $e^1$, $e^2$, $e^3$ and $e^4$, hereinbefore mentioned. Leads $e^5$ and $e^6$ connect brush-holders $a$ and $c$ to the shunt field comprising the coils 7.

All of the insulation used within the motor, with the exception of the material used to insulate the brush-holders $a$ and $b$ from the end-bonnet 2, is made of glass. The insulation beneath the brush-holders $a$ and $b$ may be a phenolic condensation product such as "Bakelite."

In order to maintain the exacting speed-load characteristics required of an electric motor to be used in military aircraft, it is essential that the parts be accurately assembled and that there be not the slightest variation in the air-gap between the rotor and stator throughout the entire range of the device. To that end, I have specially designed the armature shaft so as to positively locate the parts carried thereby, and so as to resist all forces tending to shift or deflect the shaft. As shown most clearly in Fig. 2, the shaft 12 is formed with a portion 12$^d$ of maximum diameter which carries the knurled portion 12$^c$ upon which the hub 17$^a$ of the motor-ventilating fan is supported. To the right of the portion 12$^d$ the shaft has a reduced diameter 12$^e$ upon which the anti-friction bearing 11 is fitted. The shoulder 12$^f$ between the portions 12$^d$ and 12$^e$ abuts the inner race member of the bearing 11 and holds that bearing in place in the bearing boss 9. Adjacent the opposite end of portion 12$^d$ the shaft is slightly reduced in diameter forming the portion 12$^g$ upon which is formed the knurling 12$^a$ which secures the rotor laminations 13 to the shaft. A shoulder 12$^h$ at the juncture of the shaft portions 12$^d$ and 12$^g$ serves as an abutment to limit the sliding movement of the insulating end-pieces and the rotor laminations 13 onto the shaft 12. The commutator C is secured upon the knurled portion 12$^i$ of the shaft which is slightly smaller in diameter than the portion 12$^g$, the inner sleeve $c^5$ of the commutator being pressed on the shaft until it contacts a shoulder 12$^j$ provided by the shaft portion 12$^g$. A still further reduced portion 12$^k$ of the shaft carries the inner race member of the anti-friction bearing 10, said race member being engaged by a thrust washer 33 which in turn is in contact with a shoulder 12$^m$ at one end of the shaft portion 12$^l$. The outer race member of the anti-friction bearing 10 bears upon an expansion spring washer 34 fitted within the bearing boss 8 provided by the end-bonnet 2. From the foregoing it will be perceived that the shaft 12 is unusually large and rigid and provides shoulders for definitely locating the various elements secured thereon.

As hereinbefore stated, the present motor is designed to drive two separate driven devices, such for example as hydraulic pumps. To that end, the armature shaft 12 extends beyond the end-bonnets 2 and 3 and those ends are splined as shown at 35 and 36 for the reception of coupling elements 37 and 38, also splined on the adjacent ends of the shafts $p$ and $p^1$ of the driven devices P and P$^1$ indicated partially in dotted lines in Fig. 1.

To facilitate attaching the driven devices to the electric motor, the end-bonnets 2 and 3 are formed with end flanges 2$^f$ and 3$^f$, respectively, which are substantially square in face view, to which complemental end flanges $p^2$ and $p^3$ of the driven devices are secured in surface contact, as by bolts 39 and nuts 40. Because of the metal-to-metal contact of the driven devices with the main motor casing those devices assist in the conduction and radiation of heat generated in the commutators.

A motor having the desirable operating characteristics herein described may be produced by constructing it in accordance with the following design data:

Armature:
 Diameter_____inches____ 3
 Length_____do____ 2½
 Number of slots_____ 20
 Conductors per slot_____ 12
 Size of conductor_____No. 17 copper__ 2
Commutator:
 Diameter_____inches__ 1¾
 Length_____do____ 1⅜
 Number of bars_____ 40
Yoke:
 Outside diameter_____inches__ 5
 Inside diameter_____do____ 4½
 Length_____do____ 3⅜

Main pole:
 Length_____inches__ .718
 Section_____do____ 1 x 2⅜
 Enclosure_____per cent__ 65
Field coil:
 Turns per pole_____ 245
 Size of conductor_____No. 19 copper
Air gap:
 Length (minimum)_____inch__ .031

From the foregoing it will be apparent that I have provided an improved small, lightweight electric motor capable of producing, at a medium speed, relatively high power output per unit weight and which is particularly adapted for use in military aircraft.

Having thus set forth the nature of the invention what I claim herein is:

1. A dynamo electric machine of the non-commutating pole type comprising a main frame, an armature shaft journaled in said frame, a flux-producing field member mounted in said frame and formed with poles having chamfered faces, current-carrying coils embracing said poles, a flux-cutting armature member secured upon said shaft and comprising a core formed with slots, current-carrying coils in said slots, a commutator carried by said shaft and having a plurality of bars connected to said armature current-carrying coils, the number of bars in said commutator being a multiple of the number of the slots in said armature, and means for conducting current to said commutator, the ratio of the ampere turns of the field coils to the ampere turns of the armature coils being less than 1.2 at the full rated load of the machine.

2. A dynamo electric machine of the non-commutating pole type comprising a main frame, an armature shaft journaled in said frame, a flux-producing field member mounted in said frame and formed with poles having faces which enclose less than 66 per cent of the pole pitch, current-carrying coils embracing said poles, a flux-cutting armature member secured upon said shaft and comprising a core formed with slots, current-carrying coils in said slots, a commutator carried by said shaft and connected to said armature current-carrying coils, said commutator having twice as many bars as there are armature slots, and means for conducting current to said commutator, the ratio of the ampere turns of the field coils to the ampere turns of the armature coils being less than 1.2 at the full rated load of the machine.

3. A dynamo electric machine of the non-commutating pole type comprising a main frame, an armature shaft journaled in said frame, a flux-producing field member mounted in said frame and formed with poles having chamfered faces which enclose less than 66 per cent of the pole pitch, current-carrying coils embracing said poles, a flux-cutting armature member secured upon said shaft and comprising a core formed with slots, current-carrying coils in said slots, a commutator carried by said shaft and having a plurality of bars connected to said armature current-carrying coils, the number of bars in said commutator being a multiple of the number of slots in said commutator, and means for conducting current to said commutator, the ratio of the ampere turns of the field coils to the ampere turns of the armature coils being less than 1.2 at the full rated load of the machine.

4. In an electric motor having a main frame comprising a cylindrical field core and a pair of end-bonnets secured to the opposite ends thereof and having motor-ventilating apertures, bearing bosses projecting inwardly from said end bonnets, an armature shaft journaled in said bearing bosses, and an armature secured upon said shaft comprising an armature core and current-carrying coils carried thereby, said coils projecting beyond one end of said armature core; motor ventilating means including a fan having a hub secured upon said shaft within the projecting end of said coils, said fan also being formed, adjacent said hub, with a cup-like portion which receives one of said bearing bosses, and radially disposed blades projecting outwardly from said cup-like portion.

5. A dynamo electric machine of the non-commutating pole type comprising a main frame, an armature shaft journaled in said frame, a flux-producing field member mounted in said frame and formed with poles having chamfered faces which enclose less than 66 per cent of the pole pitch, current-carrying coils embracing said poles, a flux-cutting armature member secured upon said shaft and comprising a core formed with slots, current-carrying coils in said slots, a commutator carried by said shaft and connected to said armature current-carrying coils, and means for conducting current to said commutator, the ratio of the ampere turns of the field coils to the ampere turns of the armature coils being less than 1.2 at the full rated load of the machine.

ROSS D. INGALLS.